E. JORDAN.
Machine for Cutting, Drawing and Stamping
Sheet-Metal.
No. 211,407. Patented Jan. 14, 1879
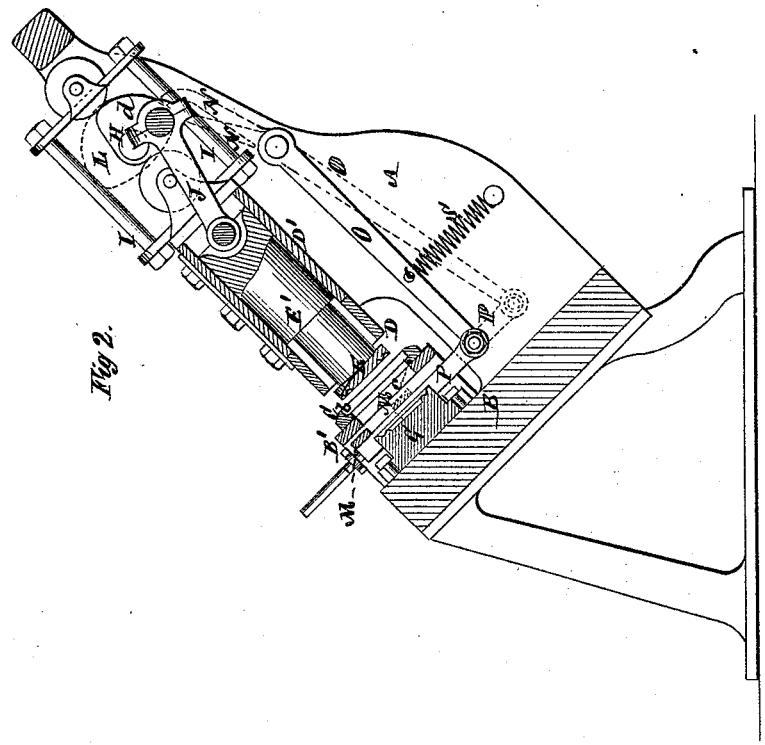
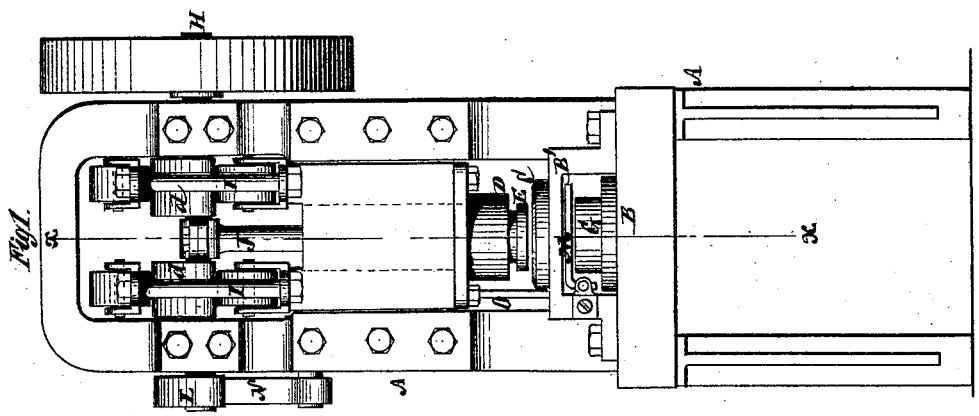

UNITED STATES PATENT OFFICE.

EDMUND JORDAN, OF BROOKLYN, NEW YORK, ASSIGNOR TO BLISS AND WILLIAMS, OF SAME PLACE.

IMPROVEMENT IN MACHINES FOR CUTTING, DRAWING, AND STAMPING SHEET METAL.

Specification forming part of Letters Patent No. 211,407, dated January 14, 1879; application filed September 20, 1878.

*To all whom it may concern:*

Be it known that I, EDMUND JORDAN, of Brooklyn, in the county of Kings and State of New York, have invented certain Improvements in Presses for Cutting, Drawing, and Stamping Sheet Metal and other substances, of which the following is a description, reference being had to the accompanying drawing, forming part of this specification.

This invention relates to presses for cutting from a plate or sheet the blank from which the article to be produced is formed, for cupping or dishing and drawing said blank into shape, and for stamping or embossing it with any suitable design, numbers, or letters, all of which operations are performed in a continuous manner and in timely order with each other without removing the work from the press during said operations.

The invention is more particularly designed to be applied to power-presses in which the work bed or table is set inclining from a horizontal position to facilitate the clearance of scrap and discharge of the work from the press.

The invention consists in a novel combination of reciprocating and stationary dies, a shaft from which the moving dies receive their motion, and a work clearer or discharger actuated by said shaft and a spring combined, whereby a simple and efficient action generally is obtained for the press.

In the accompanying drawing, Figure 1 represents a front elevation of a power-press constructed in accordance with my invention; and Fig. 2, a vertical section of the same on the line *x x*, also showing by full and dotted lines the work-discharger in its two extreme positions.

A is the frame of the press, having an inclined work bed or table, B, arranged to incline downwardly in a backward direction, and a similarly-inclined yoke, B', mounted thereon, to facilitate discharge of the scrap and delivery of the finished work.

Secured on or in the yoke B' is a stationary lower female cutting and cupping-die, C, upon which the plate or sheet of metal or material to be worked is placed, and which is constructed with a work-stripping shoulder, *c*.

D is the upper reciprocating male cutting-die, attached to a sliding hollow holder, D', arranged to occupy an inclined position corresponding with the inclined work-table B and yoke B'. This die-holder D' is reciprocated or free to work up and down within suitable guides in the frame A, to effect the cutting of the blank from the sheet by the entry of the die D within the mouth *b* of the die C as said die D is brought down by its holder D'.

Arranged to reciprocate longitudinally within and through the hollow die-holder D' is another die-holder, E', carrying at its lower end a male cupping and embossing or stamping die, E. This die E serves to draw out and cup the cut blank to its required shape within the female cutting and cupping die C.

G is a stationary lower embossing or stamping die, arranged below the die C. The dies E and G carry on their faces, the one intaglio and the other in relief, the requisite impression which it is proposed to stamp on the article to be produced.

H is the driving-shaft of the press. This shaft has arranged on it cams *d d*, for giving the necessary up-and-down motion by a yoke, I, to the upper male cutting-die, D, through or by means of its holder D'. Between these cams *d d* the shaft H is cranked, for giving the necessary reciprocating motion by a connecting-rod, J, and the die-holder E' to the male cupping and embossing or stamping die E. The shaft H also carries a cam, L, for communicating a positive motion in one direction to a work clearer or discharger, M, arranged between the dies C and G, and set inclining in a parallel direction with the bed or table. Said clearer or discharger M is reciprocated in the direction of its inclination, and has a positive motion when moving toward the front of the press to put it in a position to act upon the work and free from interference with the work when under operation by the dies. Such positive motion is obtained by or from the cam L, a lever, N, on which said cam acts, an arm, O, attached to the rock-shaft of said lever, and a rod, P, connecting said arm with the sliding or reciprocating clearer M. A spring, S, connected with the arm O, or otherwise with the clearer, serves to pull the latter toward the back of the press, to discharge or clear the work, and to keep the lever N up against the cam L. By giving to the discharger or clearer a spring-pressure action when discharging the work, breakage of parts is avoided should the work stick in the die when the clearer comes up to the work to discharge it; and by said clearer having a positive motion in its back stroke, it cannot fail to be out of the way of the dies during the action of the dies on the work.

In the operation of the press the discharger or clearer M first moves toward the front of the press, and remains stationary out of the way of the dies till it is required to discharge the work. During this movement of the discharger M the upper male cutting-die, D, comes down to cut the requisite blank from the plate or sheet, and remains stationary in the lower cutting and cupping die, C, to hold down on the cut blank therein while the drawing or male cupping and embossing or stamping die E descends to draw and cup the cut blank in the die C, and, as the cupped work is pressed down on the lower stationary embossing-die, G, to give the necessary impression on the work. After this the dies D and E are raised again clear of the die C, and the discharger M is pulled backward—that is, moved toward the back of the press—by the action of the spring S, to discharge or clear the work from the die C, and from between the dies C and G.

I claim—

The combination of the stationary female cutting and cupping die C, the reciprocating male cutting-die D, the reciprocating male cupping and stamping die E, the stationary embossing or stamping die G, the cranked shaft H, from which motion is communicated to the dies D and E, the rod J, the cams $d\ d$, the yoke I, the intermittently-reciprocating work-clearer M, the cam L, the lever N, the arm O, the rod P, and the spring S, substantially as specified.

EDMUND JORDAN.

Witnesses:
   FRED. HAYNES,
   T. J. KEANE.